United States Patent
Davies (10) Patent No.: US 7,448,241 B2
(45) Date of Patent: Nov. 11, 2008

(54) SAFETY SYSTEM

(76) Inventor: Kevin S. Davies, 18 Tecoma Street, Duncraig 6023 (AU)

( * ) Notice: Subject to any disclaimer, the term of this patent is extended or adjusted under 35 U.S.C. 154(b) by 339 days.

(21) Appl. No.: 10/517,802

(22) PCT Filed: Jun. 10, 2003

(86) PCT No.: PCT/AU03/00707

§ 371 (c)(1), (2), (4) Date: Dec. 10, 2004

(87) PCT Pub. No.: WO03/104711

PCT Pub. Date: Dec. 18, 2003

(65) Prior Publication Data

US 2005/0241355 A1    Nov. 3, 2005

(30) Foreign Application Priority Data

Jun. 11, 2002 (AU) .................................. PS2878
Jul. 10, 2002 (AU) .............................. 2002950078
Sep. 12, 2002 (AU) .............................. 2002951351

(51) Int. Cl.
*B21D 55/00* (2006.01)
*B21B 37/58* (2006.01)
*B21C 51/00* (2006.01)
*F16P 3/14* (2006.01)

(52) U.S. Cl. ................... 72/1; 72/14.3; 72/20.1; 72/37; 100/348

(58) Field of Classification Search .................. 100/348, 100/342; 72/1, 20.1, 14.3, 18.1; 192/129 A, 192/129 R, 130, 133, 134; 250/221; 340/555–557
See application file for complete search history.

(56) References Cited

U.S. PATENT DOCUMENTS 4,660,703 A * 4/1987 Filcich et al. ............... 192/130

(Continued)

FOREIGN PATENT DOCUMENTS

EP    0 995 942 A1    4/2000

(Continued)

OTHER PUBLICATIONS

English Abstract of JP2001071192, published Mar. 21, 2001.

*Primary Examiner*—Derris H. Banks
*Assistant Examiner*—Teresa Bonk
(74) *Attorney, Agent, or Firm*—Bachman & LaPointe, P.C.

(57) ABSTRACT

A safety system for use with a machine having a moving tool arranged to move through a known path of movement. The safety system is arranged to detect the presence of an obstruction in a region (20) around a portion of said path deemed to be hazardous. The safety system is characterised by comprising a light emitting means (16), a light receiving means (18) and a processing and control means. The light emitting means (16) is arranged to emit light generally parallel to the path of movement of the tool such that the region (20) is illuminated. The light receiving means (18) is arranged to receive light from the light emitting means (16) which has passed through the region (20). The processing and control means is arranged to receive information from the light receiving means (18) and determine whether an obstruction exists in the region (20) by the presence of one or more shadow regions cast on the light receiving means (18) by the obstruction and to control movement of the tool (12) dependent on the presence of obstructions in the region (12).

59 Claims, 6 Drawing Sheets

U.S. PATENT DOCUMENTS

| | | | |
|---|---|---|---|
| 4,772,801 A * | 9/1988 | Fornerod et al. | 250/559.13 |
| 5,243,183 A * | 9/1993 | Barron et al. | 250/221 |
| 5,579,884 A | 12/1996 | Appleyard et al. | |
| 6,316,763 B1 | 11/2001 | Appleyard et al. | |
| 6,444,973 B1 * | 9/2002 | Dissey | 250/221 |
| 6,644,080 B2 * | 11/2003 | Lindstrom | 72/19.4 |
| 6,778,092 B2 | 8/2004 | Braune | |
| 6,903,327 B1 * | 6/2005 | Appleyard | 250/221 |
| 2003/0062469 A1 | 4/2003 | Braune et al. | |

FOREIGN PATENT DOCUMENTS

| | | |
|---|---|---|
| EP | 1246148 A2 | 10/2002 |
| JP | 2001-71192 | 3/2001 |
| WO | WO 00/67932 | 11/2000 |
| WO | WO 03/080268 A1 | 10/2003 |

* cited by examiner

SAFETY SYSTEM

CROSS-REFERENCE TO RELATED APPLICATION

This is the 35 USC 371 National Phase of International Application PCT/AU03/00707, filed Jun. 10, 2003, and published as WO03/104711.

BRIEF DESCRIPTION OF THE INVENTION

The present invention relates to a safety system, in particular a system for use with machinery having moving parts, such as press brakes, to detect the presence of an obstruction in the path of the moving part.

FIELD OF THE INVENTION

In the past, various mechanisms have been used to prevent the operators of industrial machinery, such as press brakes, from placing their hands beneath the moving tool during operation. Such action by the operator obviously has the potential to cause serious injury to the operator, given the force applied by the tool and the speed at which it can move.

One such safety mechanism involves the use of physical guards that are placed between the operator and the tool. The use of physical safety guards however can obstruct the view of the operator during use and impede access to the work making it difficult for the operator to perform their job in the most efficient manner. Also, physical tethers have been used to keep the operator at a safe distance from the moving tool during operation. Tethers have been employed in the form of a double handed start switch at a safe distance from the tool to ensure that the operator does not have a free hand to place near the tool during operation. The use of tethers however also makes holding and manipulation of the work difficult and therefore decreases the efficiency with which the operator can work.

Various arrangements have also been used where a number of light beams are used to create a light curtain which bounds an area around the path of the moving tool which is deemed to be hazardous. The light beams are projected onto detectors which are able to sense when the beam is broken and trigger either a halt or slow down of the movement of the tool. These arrangements of individual light beams also have disadvantages in that the operator is kept away from the work area. It is generally necessary also to reset the position of the light curtains between production batches. Also, they define only one area around the tool which, if obstructed by any object, whether part of the operator or not, will deactivate the machinery. Further the use of individual light beams also results in small gaps in the light curtain, into which small objects such as fingers can be placed without triggering deactivation of the machine.

A further method of providing safety protection is with the use of one or more light beams projected along the leading edge of the tool. The light beams are arranged to move with the tool and slow or stop the tool if an obstruction breaks the beam. In such arrangements the beam must be deactivated as the tool approaches the work and the light beam must be set at a sufficient distance from the tool to stop the tool in time. The minimum permissable distance of the beam from the tool is therefore dependent on the maximum speed of movement of the tool. In some cases, multiple light beams may be used at varying distances from the tool.

Known problems with these types of arrangements include the need to re-align the light beams when tools are changed and the possibility that an operator may move their hand under the tool just as the beams are deactivated. Also, as with light curtains, all parts of the work, such as bent up stands when bending a box in a press brake, must be kept clear of the beams as operator confirmation is required every time a new obstruction is encountered.

The present invention attempts to overcome at least in part some of the aforementioned disadvantages of previous safety systems used for detecting the presence of obstructions in hazardous areas around machines having moving parts.

SUMMARY OF THE INVENTION

In accordance with one aspect of the present invention there is provided a safety system for use with a machine having a moving part arranged to move through a known path of movement, the safety system characterised by comprising:

at least one light emitting means arranged to emit light, the axis of the emitted light being aligned to illuminate a region including at least a portion of said path of movement;

at least one light receiving means arranged to receive light from the or one or more of the light emitting means which has passed through said region; and a processing and control means arranged to receive image information from the light receiving means and thereby recognise the presence of one or more shadowed regions within the vertical and horizontal extents of said illuminated region on the light receiving means cast by obstructions in the region;

wherein the illumination of the region is such that the processing and control means has sufficient image information to determine boundaries of the or each shadowed region and control movement of the part dependent on said image information.

DESCRIPTION OF THE DRAWINGS

The present invention will now be described, by way of example, with reference to the accompanying drawings, in which:

FIG. 2a is a view of a light receiving means and lens arrangement for receiving light from the light transmitting means of FIG. 1a;

DESCRIPTION OF THE INVENTION

Referring to the Figures, there is shown a safety system for use with machinery having moving parts to detect the presence of an obstruction in the path of the moving part. In the embodiment shown, the safety system is employed on a press brake comprising a tool 12 arranged to move relative to an anvil 14 and to strike work placed on the anvil 14. The safety system includes a light emitting means 16 and a light receiving means 18. The light emitting means 16 is arranged to illuminate a region 20 around a portion of the path of movement of the tool 12 in order to detect obstructions in said region 20.

Figure 1A:
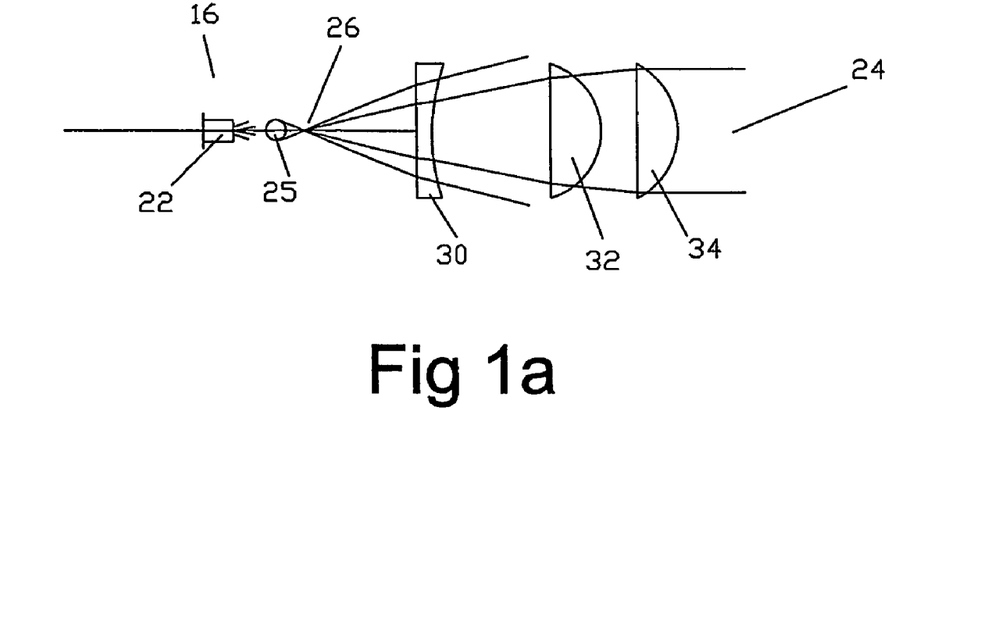
FIG. 1a is a view of a light emitting means and lens arrangement for illuminating a region under the tool, in accordance with the present invention.

FIG. 1a shows an arrangement in which a laser diode 22 is used to create a large area parallel light beam 24. In the arrangement shown in FIG. 1a, the laser diode 22 is used to illuminate a spherical ball 25. The spherical ball 25 concentrates the laser beam onto a point 26. The point source of light may be further refined by passing it through a pin hole (not shown), Past the point 26, the laser light beam is corrected by the use of a transmitting end concave lens 30 and a first transmitting end convex lens 32 so as to correct for spherical aberration such that columnated light is directed through the region. The light beam is then formed into the parallel beam 24 by a second transmitting end convex lens 34. It will be appreciated that while an arrangement using the spherical ball 24, transmitting end concave lens 30 and first and second transmitting end convex lenses 32 and 34 has been used to create the parallel light beam 24 in this embodiment, other arrangements would be possible to generate the parallel light beam 24.

Figure 1B:
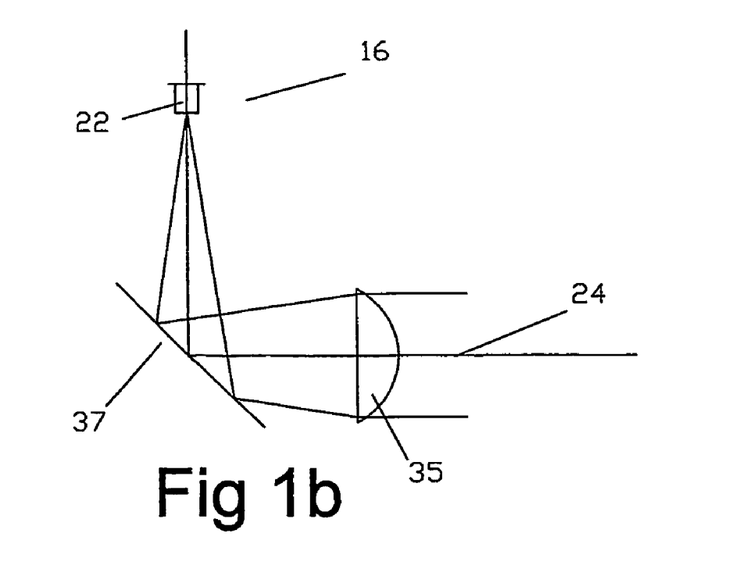
FIG. 1b is a view of an alternative embodiment of a light emitting means and lens arrangement for illuminating a region under the tool.

FIG. 1b shows an alternative arrangement in which the laser diode 22 is used to create the large area parallel light beam 24. In this arrangement, a transmitting end aspheric or achromatic lens 35 is used in place of the transmitting end concave lens 30 and first and second transmitting end convex lenses 32 and 34. Alternatively, two transmitting end convex lenses may be used in place of the aspheric or achromatic lens 35. Also a transmitting end mirror 37 is used to allow an increase in focal length without significantly increasing the length of the light emitting means arrangement which allows the two series convex lenses to be used with no further correction required.

Figure 2A:
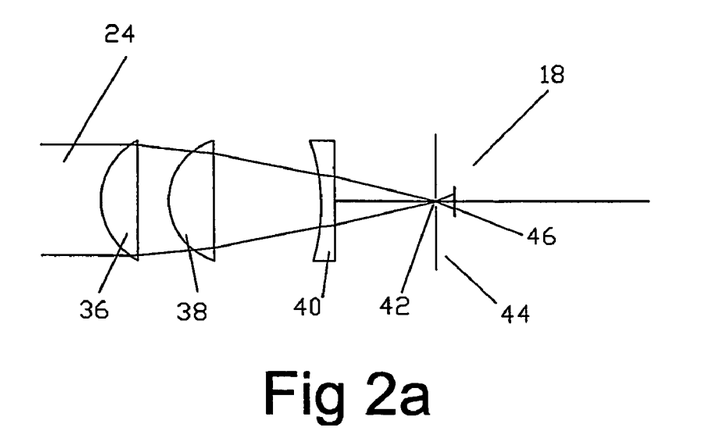

FIG. 2a shows an arrangement used for focussing the parallel light beam 24 onto the light receiving means 18. The arrangement of lenses used is the reverse of that shown in FIG. 1a, in that the light beam 24 is passed through first and second receiving end convex lenses 36 and 38 and a receiving end concave lens 40 in order to focus the beam 24 onto the light receiving means 18.

Figure 2B:
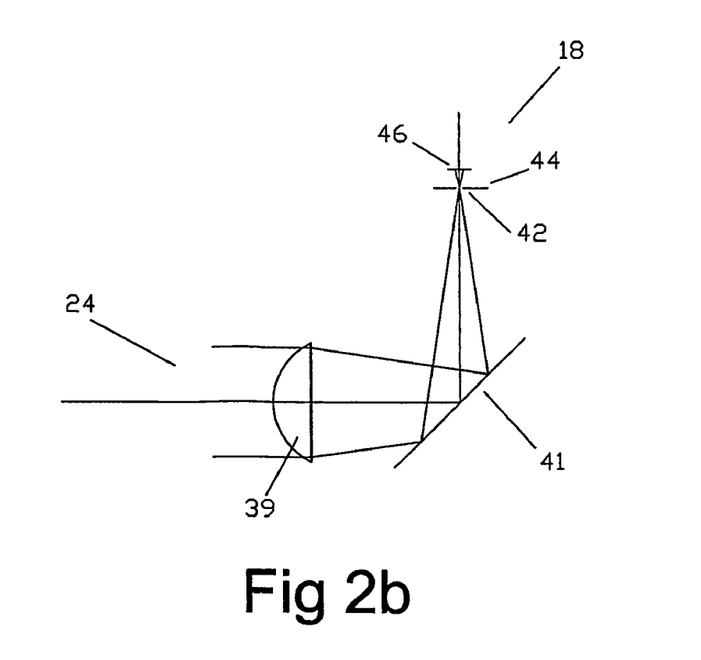
FIG. 2b is a view of a light receiving means and lens arrangement for receiving light from the light transmitting means of FIG. 1b.
Figure 3:
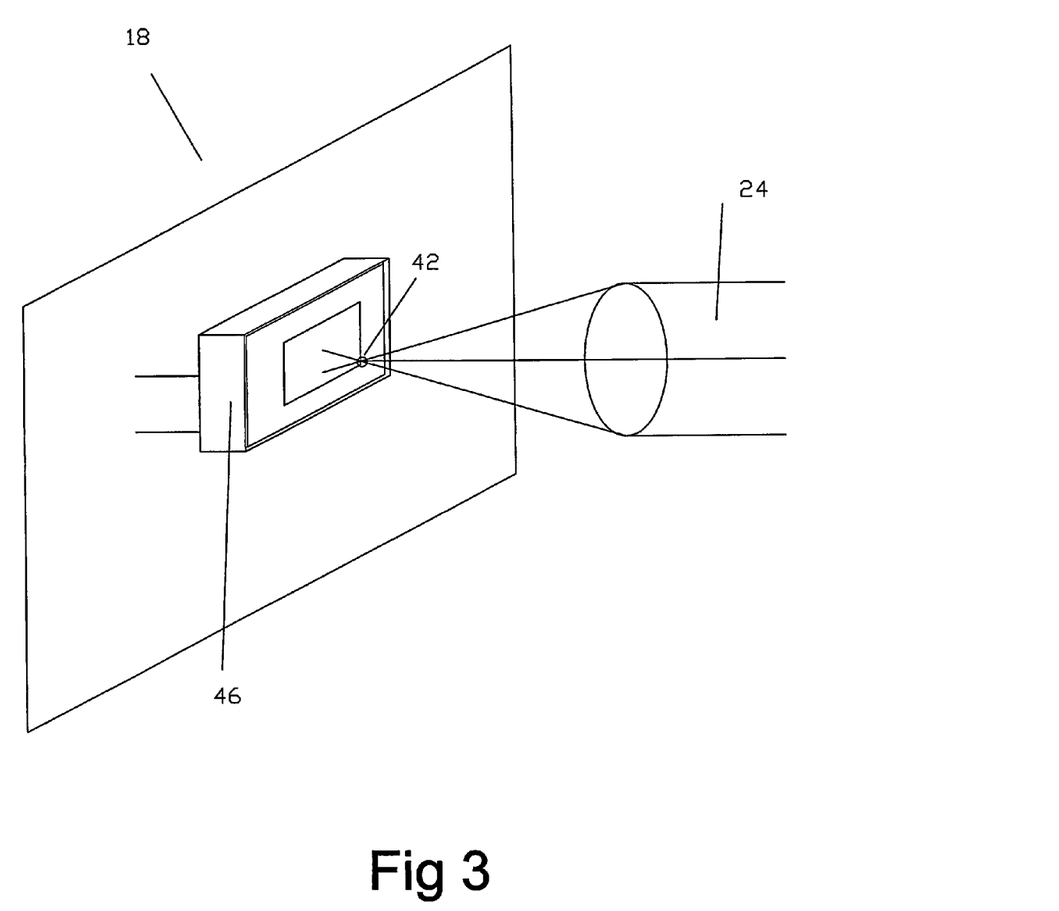
FIG. 3 is a perspective view of a CCD used as the light receiving means.

FIG. 2b shows an alternative arrangement for focussing the parallel light beam 24. The arrangement is the reverse of the transmitting end, using a receiving end achromatic or aspheric lens 39 and a receiving end mirror 41. Alternatively, two convex receiving lenses may be used in place of the achromatic or aspheric lens 39. The light receiving means 18 comprises an aperture 42 in a screen 44 and an image detection device 46. The image detection device could be a charge coupled device (CCD) or a projection screen with a camera to observe the projected image. The receiving size is preferably smaller than the image detection device 46. In this way, the portion of the image on the image detection device 46 can be used to determine misalignment. Also a high shutter speed may be used to give a strobe effect. Images and in particular the position of obstructions between the strobed images may be determined by interpolation.

Figure 4:
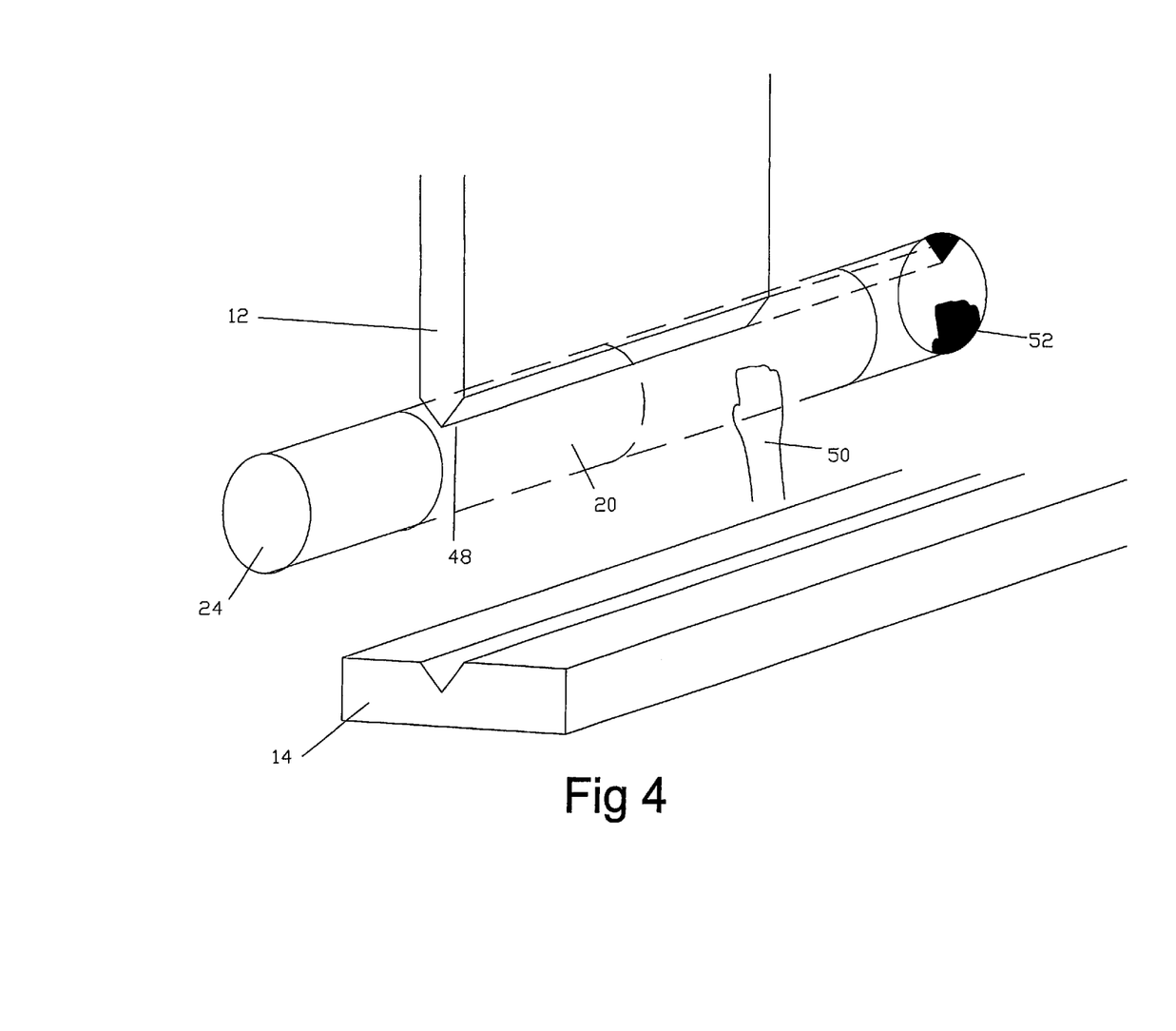
FIG. 4 is a perspective view of a press brake with a region around the tool edge illuminated in accordance with the present invention.

As shown in FIG. 4, the light emitting means 16 is mounted at one end of the tool 12 of the press brake such that the parallel light beam 24 illuminates a region 20 around the path of movement of the tool 12 which includes the forward edge 48 of the tool 12. The light receiving means 18 is mounted at the opposite end of the tool 12 to receive the light beam 24. If an obstruction 50, such as the hand of the operator, enters the region 20, a corresponding shadow 52 will be cast on the image detection device 46. The light emitting means 16 and light receiving means 18 are mounted to be stationary relative to the tool 12.

The safety system also includes a processing and control means (not shown) connected such that the processing and control means receives information from the light receiving means 18 and processes this information and controls operation of the press brake. The processing and control means may be in the form of a software program residing on a digital signal processor, a computer or embedded into a microcomputer which receives input from the output of the light receiving means 18. The processing and control means captures the images received by the image detection device 46 and processes the images to search for any unknown shadows.

The processing and control means stores in memory the image received by the image detection device 46 in which no obstructions are present. In the case where the light emitting means 16 and light receiving means 18 are mounted stationary relative to the tool 12, the image includes the forward edge of the tool 12. The processing and control means compares the current image received by the image detection device 46 with this stored image to determine the presence of any shadows on the image detection device 46 created by obstructions in the region 20. If any new obstructions are detected, the processing and control means may either stop or slow the movement of the tool 12.

In one method of controlling the movement of the tool 12 where an obstruction is detected, the processing and control means determines the vertical distance between the tool 12 and the obstruction and allows continued movement of the tool 12 while the distance determined is greater than the distance required to stop the tool 12. The processing and control means may also determine the thickness of the shadow cast by the obstruction and allow continued movement of the tool 12 if the thickness is determined to be such that the obstruction could not be part of the operator's body. If the tool 12 is to be stopped, the operator may confirm that continued operation of the tool 12 is safe by an input means, such as a button, arranged to provide a signal to the processing and control means.

Figure 6:
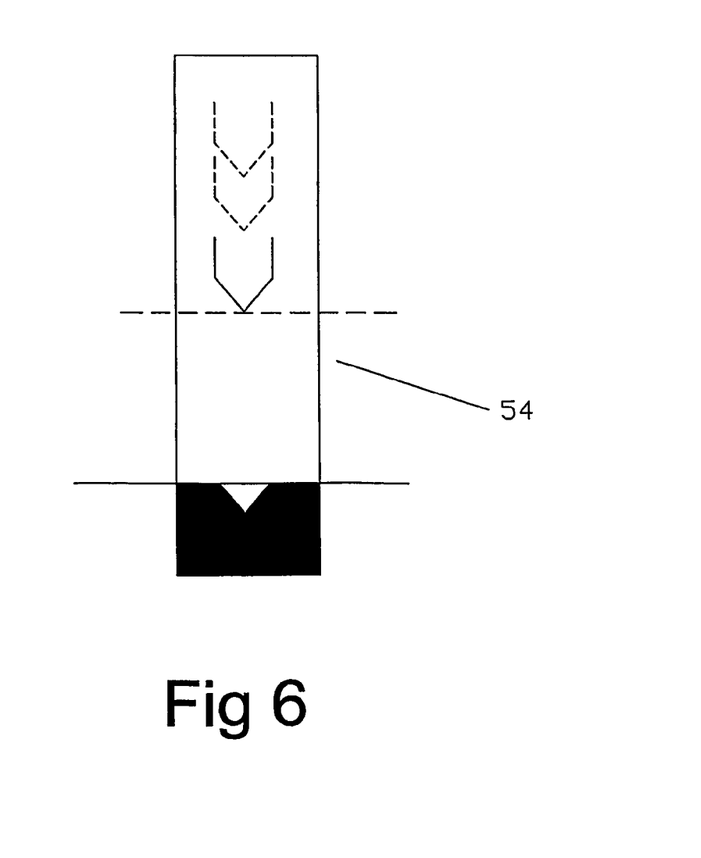
FIG. 6 is a view of a shadow map 54 created by the safety system during operation of the press brake of FIG. 4.

The processing and control means may also create a total picture made up of the image information received by the light receiving means 18 as the tool 12 moves through its path of movement. The picture is created and stored in a memory means by the processing and control means. This total picture will be referred to as a shadow map. A shadow map 54 is shown in FIG. 6 in which no shadows other than those of the tool 12 and anvil 14 are detected. Such a shadow map 54 would be created on a first pass of the tool.

The processing and control means can store in the memory means a number of known safe shadow maps. The known safe shadow maps being shadow maps 54 where no obstruction is detected which would require stopping or slowing of the press brake. For example, the shadow map 54 in which the only shadow cast is that of the forward edge of the tool 12 and the anvil would be a known safe shadow map 54.

In use, if an obstruction is placed in the path of the light beam 24, a shadow 52 is cast on the image detection device 46. The processing means recognises the presence of an unknown shadowed area in the shadow map 54 and halts or slows the movement of the tool until either the shadow disappears by removal of the obstruction or the operator confirms that operation of the press brake is safe to continue by operation of the input means. Further the processing and control means could allow the tool 12 to descend to a point adjacent the obstruction before stopping in order to assist the operator to identify the location of the obstruction which has triggered the deactivation of the press brake.

In the case where the obstruction detected by the safety system is one deemed to be safe to continue operation, such as the edge of work which has previously been bent up, the processing and control means stores that shadow map as a known safe shadow map. Therefore, when this work is repeated, the processing and control means automatically recognises the obstruction as being non-hazardous and allows continued operation of the press brake.

The processing and control means may still however determine that an obstruction is hazardous even if the obstruction has previously been detected and the operator has confirmed it is safe to proceed. For example, if the processing and control means detects a known shadow adjacent an edge of the illuminated region, and the known shadow is determined to be of a sufficient size that it could be hiding a hazardous obstruction, then the processing and control means may need to slow or stop movement of the tool 12, or stop the blade at a suitable distance from the material.

To maintain safety requirements, the known safe shadow maps are discarded by the processing and control means if they are not re-detected within a specified time period.

Figure 7:
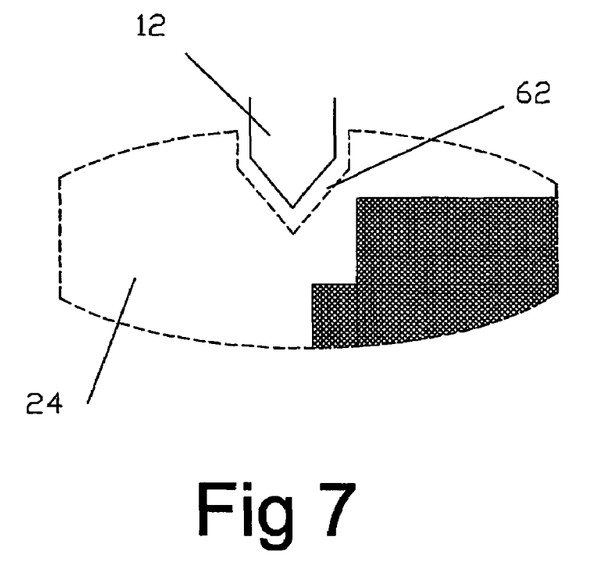
FIG. 7 is a view of an illuminated region having a stop-zone defined around the tool.
Figure 8:
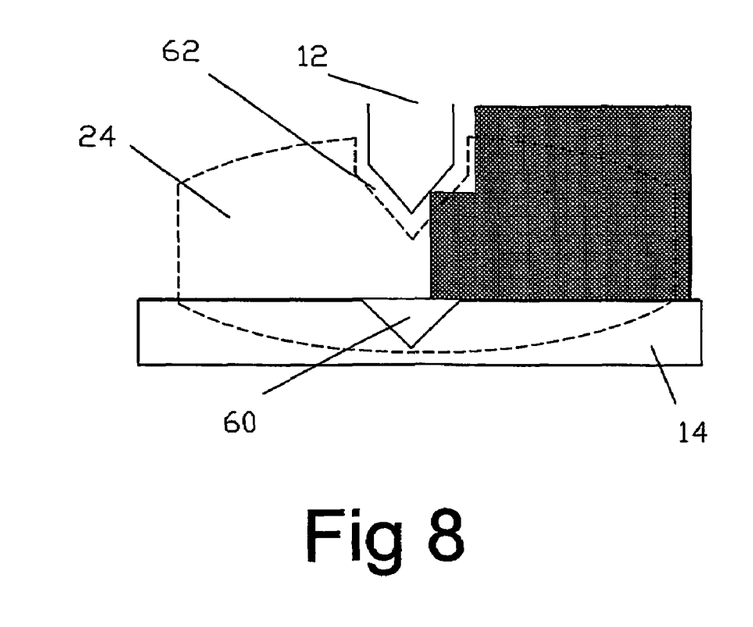
FIG. 8 is a view of the illuminated region of FIG. 7 as the tool approaches the anvil.

In order to create the shadow maps 54 during operation, a tool position detector is required to provide information to the processing and control means as to the position of the tool 12 from the anvil 14 in order to create the full shadow map. An alternative embodiment, as shown in FIGS. 7 and 8, of the safety system may be provided in which a tool position detector is not used to detect the possible position of the tool 12. In this embodiment, the processing and control means is arranged to detect the presence of a V-shaped illuminated region 60, being the region defined between the 'V' of the anvil 14 and the work.

Also in this embodiment the processing and control means is arranged to define a stop-zone 62, being an area of the illuminated region around the edge of the tool 12. If the stop-zone 62 is obstructed when the V-shaped illuminated region 60 is determined to be an unsafe distance from the point of obstruction, as shown in FIG. 8, then the processing and control means causes the tool 12 to be stopped a safe distance from the material. Operator confirmation is then required to proceed.

The detection of the presence of the anvil 14 may also be through other means. This may be necessary if, for example, parts of the work obstruct the V-shaped illuminated region 60, preventing accurate detection. Preferably a combination of these techniques would be used.

The processing and control means also includes means to reduce the possibility of false triggering. The processing and control means provides for shadow expansion, whereby the shadow is expanded by a sufficient number of pixels to allow for vibration or other inaccuracies. Also, shadows created while the tool 12 is stopping are ignored due to the possibility of the high deceleration deflecting the light emitting and receiving means 16 and 18. Further, the processing and control means ignores the action of the press brake back gauge. The shape and possible positions of the back gauge are pre-configured into the safety system when the safety system is first commissioned.

Figure 5:
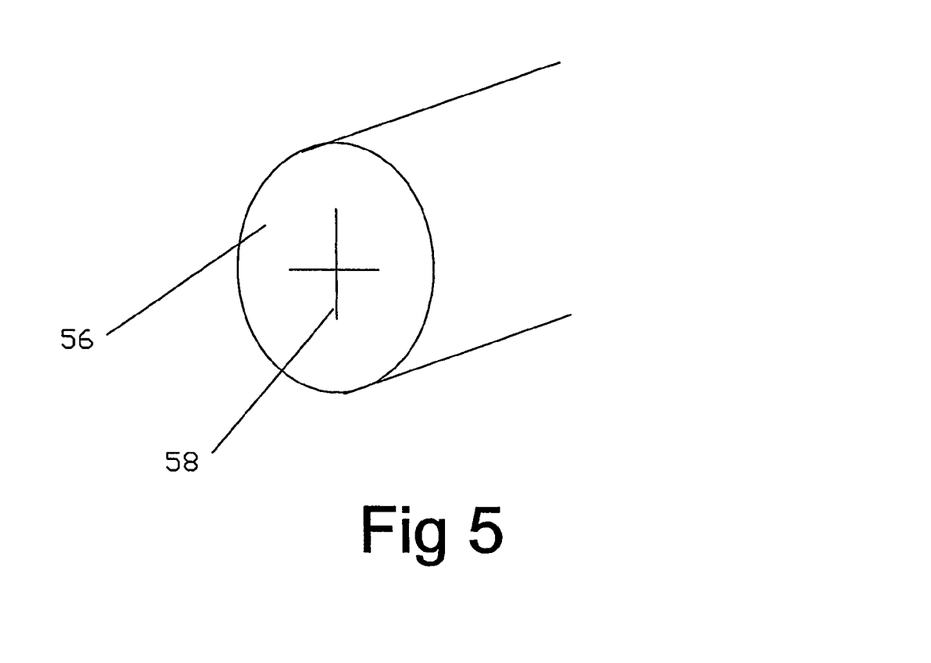
FIG. 5 is a cross sectional view of the illuminated region created by the light emitting means showing a shadow mask used for checking purposes.

The safety system would preferably be provided with a shadow mask 56, as shown in FIG. 5, placed in front of the light emitting means 16 used for checking that the safety system is receiving the light beam 24 correctly. The shadow mask 56 comprises a shape known to the processing and control means, such as a cross 58. The processing and control means then checks for the presence of the shadow mask 56 shape and triggers deactivation of the press brake should the shadow mask 56 not be detected. Further, shadow masks may be provided at both the light emitting means 16 end and light receiving means 18 end. By ensuring alignment of the shadow masks at each end, alignment of the system can be confirmed or a slight misalignment compensated for.

It may be required due to some safety standards for the light emitting device to be pulsed such that the light emitting means 16 is turned off or dimmed between each frame being acquired. The light emitting means 16 would preferably be turned on for the minimum time period required to activate the image detection device, thus assisting the processing and control means via a strobing effect. The processing and control means can use the off or dimmed period to ensure that ambient light does not falsely illuminate the light receiving means 18.

The safety system may be provided with an output device, such as a screen or computer monitor which displays the images cast on the image detection device 46 and therefore assists the operator in identifying the obstructions detected.

The safety system could also include the use of a quartz deflection device in front of the light transmitting means 16 to correct for vibration and could also employ off-axis parabolic reflectors within the light emitting and receiving means 16 and 18 arrangements to remove the need for lensing and increase the sensing area. Also, the processing and control means could analyse the bending of the work in order to reduce the risk of finger entrapment between the work and the tool 12. The movement of shadows that are inconsistent with bending material may also be used to determine an unsafe state.

Also the safety system may include vernier adjustments for the direction of the light emitting and/or receiving means 16 and 18 and either adjust the direction automatically or show lights on the device to indicate in which direction the device is out of alignment.

Modifications and variations as would be apparent to a skilled addressee are deemed to be within the scope of the present invention. For example, while the light beam 24 is described as a large area parallel light beam, it would be possible to use a matrix of focussed light emitting means and a matrix of discrete sensors. A sweet spot pin photodiode could be used with a matrix of light emitting means being pulsed so as to produce a picture. Alternatively, a scanning parallel ray laser could be used in place of the matrix of light emitting means. In this method, the lights in the matrix could be pulsed one after the other in a scanning arrangement or the laser scanned so that the pin photodiode turns on when a parallel ray of light is received from the matrix and stays off when an obstruction casts a shadow. Further, a row of sweet spot pin photodiodes could be used and places behind an optical slit. Many wide beam lasers could then be flashed sequentially so as to produce a picture in a similar fashion to that described above.

Also, the light emitting means 16 and light receiving means 18 could be mounted to be stationary with respect to the anvil 14 rather than the tool 12 and alternative devices could be used for the components of the light emitting means 16, light receiving means 18 and associated optical equipment. For example, an off-axis parabolic reflector could be used as a replacement for the mirror and lens arrangements of the embodiment shown in FIGS. 1b and 2b.

What is claimed is:

1. A safety system for use with a machine having a moving part arranged to move through a known path of movement, the safety system characterised by comprising:

at least one light emitting means arranged at one end of the part to emit light, the axis of the emitted light being aligned to illuminate a region around at least a portion of said path of movement including, in use, a forward edge of the part;

at least one light receiving means arranged at an opposite end of the part to receive light from one or more of the light emitting means which has passed through said region; and a processing and control means arranged to receive information from the light receiving means and thereby recognise the presence of one or more shadowed regions within vertical and horizontal extents of said illuminated region on the light receiving means cast by obstructions in the region;

wherein the illumination of the region is such that the processing and control means has sufficient information to determine boundaries of the or each shadowed region and control movement of the part dependent on said information.

2. A safety system in accordance with claim 1, characterised in that the processing and control means either slows or stops the movement of the part if the processing and control means determines the presence of an obstruction in a predetermined or calculated area of the region.

3. A safety system in accordance with claim 1, characterised in that the processing and control means calculates the positions of the obstructions relative to the part or relative to each other and slows or stops the part dependent on the relative positions.

4. A safety system in accordance with claim 1, characterised in that the processing and control means calculates the speeds of movement of the obstructions relative to the part or relative to each other and slows or stops the part dependent on the relative speeds.

5. A safety system in accordance with claim 1, characterised in that the region is large with respect to the size of a leading edge of the part and is entirely illuminated by a single parallel beam of light.

6. A safety system in accordance with claim 1, characterised in that the region is large with respect to the size of a leading edge of the part and is illuminated by an array of individual light beams.

7. A safety system in accordance with claim 1, characterised in that the light receiving means is provided with an aperture to reject received light that is not parallel to the axis of the emitted light.

8. A safety system in accordance with claim 1, characterised in that an input means is provided such that when the processing and control means slows or stops the movement of the part, actuation of the input means by the operator informs the processing and control means that continued movement of the part is safe and the processing and control means resumes movement of the part.

9. A safety system in accordance with claim 8, characterised in that when the processing and control means is informed that continued movement is safe, the processing and control means stores in a memory means one or more maps made up of image information received by the light receiving means as the part moves through the path of movement.

10. A safety system in accordance with claim 9, characterised in that the processing and control means compares the current image received by the light receiving means to the maps stored in the memory means and allows continued operation of the part if sufficiently similar.

11. A safety system in accordance with claim 9, characterised in that the processing and control means compares the current image map being created as the part moves through the path of movement to the maps stored in the memory means and allows continued operation of the part if sufficiently similar.

12. A safety system in accordance with claim 1, characterised in that a part position detector is provided to detect the position of the part relative to the machine, the part position detector being arranged to provide information regarding the part position to the processing and control means.

13. A safety system in accordance with claim 1, wherein the processing and control means is arranged to determine the vertical distance between a forward edge of the part and an obstruction casting a shadow on the light receiving means and allows continued movement of the part if the distance determined is greater than a predetermined distance required to safely stop the part.

14. A safety system in accordance with claim 1, characterised in that the processing and control means is arranged to determine the thickness of an obstruction casting a shadow on the light receiving means and allow continued movement of the part should the thickness be less than a predetermined value, the predetermined value being a value determined to be small enough that the obstruction could not be a finger of the operator's body.

15. A safety system in accordance with claim 1, characterised in that the light receiving means provides image information to the processing and control means and utilises a high shutter speed to give a strobe effect.

16. A safety system in accordance with claim 1, characterised in that the light receiving means provides image information to the processing and control means and the light emitting means is flashed to create strobescopic images of the obstruction.

17. A safety system in accordance with claim 16, characterised in that the processing and control means uses interpolation to determine the position of obstructions between samples.

18. A safety system in accordance with claim 16, characterised in that the processing and control means uses interpolation to estimate the position of obstructions at some time in the future.

19. A safety system in accordance with claim 16, characterised in that said flashing of the light emitting means is alternation between an on state in which the light emitting means emits light and a dim state in which the intensity of the light emitted by the light emitting means is reduced relative to the on state.

20. A safety system in accordance with claim 1, characterised in that the light receiving means includes a charge coupled device.

21. A safety system in accordance with claim 1, characterised in that the light receiving means comprises a projection screen and image information is detected by a camera arranged to observe the image on the projection screen.

22. A safety system in accordance with claim 1, characterised in that the light receiving means and the light emitting means are mounted to be stationary relative to the part.

23. A safety system in accordance with claim 1, characterised in that the light receiving means and the light emitting means are mounted stationary relative to the machine having the moving part.

24. A safety device in accordance with claim 1, characterised in that a receiving size of the illuminated region is smaller than an image detection device of the light receiving means and the position of the image on the image detection device is used to determine misalignment.

25. A safety system in accordance with claim 1, characterised in that one or more shadow mask is provided and the processing and control means is arranged to recognise the shadow created by the shadow mask on the light receiving means and use this information to determine that the light receiving means is functioning correctly.

26. A safety system in accordance with claim 25, characterised in that the processing and control means is arranged to recognise the shadow created by the shadow mask on the light emitting means and use this information to determine if the safety system is in correct alignment.

27. A safety system in accordance with claim 26 or 24, characterised in that a shadow mask is provided and the processing and control means is arranged to detect alignment of the system and thereby compensate for misalignments.

28. A safety system in accordance with claim 1, characterised in that a display device is provided to display the images received by the light receiving means.

29. A safety system in accordance with claim 1, characterised in that the light emitting means includes one or mores lasers as a light source.

30. A safety system in accordance with claim 1, characterised in that the light emitting means includes one or mores laser diodes as a light source.

31. A safety system in accordance with claim 1, characterised in that the light emitting means includes a transmitting end lens arrangement including one or more transmitting end lenses such that light is directed by the transmitting end lens arrangement through the region.

32. A safety system in accordance with claim 31, characterised in that the transmitting end lens arrangement includes one or more concave lenses to expand the light beam.

33. A safety system in accordance with claim 32, characterised in that the transmitting end lens arrangement includes a transmitting end spherical ball to focus the light.

34. A safety system in accordance with claim 31, characterised in that the light is focussed through a pinhole.

35. A safety system in accordance with claim 31, characterised in that the transmitting end lens arrangement includes an aspheric lens arranged to columnate the light.

36. A safety system in accordance with claim 31, characterised in that the transmitting end lens arrangement includes a lens to correct for spherical aberration such that columnated light is directed through the region.

37. A safety system in accordance with claim 1, characterised in that the light emitting means includes a transmitting end reflector, the axis of the emitted light being transmitted off axis relative to the light passing through the region.

38. A safety system in accordance with claim 37, characterised in that the reflector is an off-axis parabolic reflector.

39. A safety system in accordance with claim 1, characterised in that the light receiving means includes a receiving end lens arrangement such that light passing through the region is focussed by the receiving end lens arrangement.

40. A safety system in accordance with claim 39, characterised in that the receiving end lens arrangement includes a lens to correct for spherical aberration.

41. A safety system in accordance with claim 39, characterised in the focussed light from the receiving end lens arrangement passes through one or more apertures.

42. A safety system in accordance with claim 39, characterised in that the receiving end lens arrangement includes an aspheric lens.

43. A safety system in accordance with claim 1, characterised in that the light receiving means includes a receiving end reflector, the receiving end reflector arranged to reflect light which has passed through the region toward the or each light receiving means.

44. A safety system in accordance with claim 43, characterised in that the reflector is an off-axis parabolic reflector.

45. A safety system in accordance with claim 1, characterised in that the machine is a bending machine and the moving part is a tool of the machine.

46. A safety system in accordance with claim 1, characterised in that the machine is a bending machine and the moving part is an anvil of the machine.

47. A safety system in accordance with claim 45 or 46, characterised in that the moving part is arranged to bend material and the processing and control means controls movement of the moving part during bending.

48. A safety system in accordance with claim 47, characterised in that the movement of the part during bending is slowed or stopped if the image received by the light receiving means is inconsistent with pre-stored or calculated images of material being bent in the same manner.

49. A safety system in accordance with claim 1, characterised in that the part is a tool, the tool is arranged to bend material and the processing and control means controls movement of the tool during bending.

50. A safety system for use with a machine having a moving part arranged to move through a known path of movement, the safety system comprising:
light emitting means at one end of the part for emitting light so as to illuminate a region around at least a portion of said path including, in use, a forward edge of the part;
light receiving means at an opposite end of the part for receiving the emitted light; and
a processing and control means for receiving image information from the light receiving means and recognising the presence of a shadowed region within vertical and horizontal extents of said illuminated region on the light receiving means cast by an obstruction in the region, determining a boundary of the shadowed region, and controlling movement of the part responsive to the image information.

51. A safety system for use with a machine having a moving part arranged to move through a known path of movement, the safety system comprising:
at least one light source positioned at one end of the part to emit light so as to illuminate a region around at least a portion of said path including, in use, a forward edge of the part;
at least one light detector positioned at an opposite end of the part to receive a portion of the emitted light which has passed through said region; and
a processor, coupled to the light detector to receive image information from the light detector and programmed to recognise the presence of at least one shadowed region within vertical and horizontal extents of said illuminated region on the light receiving means cast by at least one obstruction in the region, determine at least one boundary of the at least one shadowed region, and control movement of the part.

52. A machine comprising:
an anvil;
a work item on the anvil;
a moving part arranged to move through a known path of movement toward the work item to strike the work item;
at least one light source positioned at one end of the part to emit light so as to illuminate a region around at least a portion of said path including, in use, a forward edge of the part;
at least one light detector positioned at an opposite end of the part to receive a portion of the emitted light which has passed through said region; and
a processor, coupled to the light detector to receive image information from the light detector and programmed to recognise the presence of at least one shadowed region within vertical and horizontal extents of said illuminated region on the light receiving means cast by at least one obstruction in the region, determine at least one boundary of the at least one shadowed region, and control movement of the part.

53. A method for operating a machine, the machine having a moving part, the method comprising:
moving the moving part along a known path of movement;
emitting light at one end of the part to illuminate a region around at least a portion of said path including, in use, a forward edge of the part;
receiving a portion of the light at an opposite end of the part which has passed through said region;
recognising the presence of a shadow within vertical and horizontal extents of said illuminated region cast by an obstruction in the region;
determining a boundary of the shadow; and
controlling movement of the part responsive to a property of the shadow.

54. The method of claim 53 wherein:
the controlling comprises at least one of slowing, stopping, and reversing the movement responsive to the presence of the obstruction; and
the movement is toward a work to strike the work.

55. A system, for use with a machine having a moving part arranged to move through a known path of movement, the system characterized by comprising:
at least one light emitting means arranged at one end of the part to emit light, the axis of the emitted light being aligned to illuminate a region around at least a portion of said path of movement including, in use, a forward edge of the part;
at least one light receiving means arranged at an opposite end of the part to receive light from one or more of the light emitting means which has passed through said region; and
a processing and control means arranged to receive information from the light receiving means and thereby recognize the presence of one or more shadowed regions within vertical and horizontal extents of said illuminated region on the light receiving means cast by obstructions in the region;
wherein the processing and control means processes said information received from the region and controls the part dependent on said processed information.

56. A system according to claim 55, characterized in that the processing and control means saves information received from the region and controls the part dependent on said saved information.

57. A system according to claim 55, characterized in that the processing and control means controls the part dependent on the shapes and/or positions of the shadowed regions.

58. A system according to claim 55, characterized in that machine is used for bending material and the processing and control means analyses information from the region during bending and controls the part dependent on said analysis.

59. A system according to any one of claims 55 to 58, characterized in that light emitting or receiving means includes a reflector, the axis of the emitted light or received light being transmitted off axis or received off axis relative to the light passing through the region.

* * * * *